US007186916B2

(12) United States Patent
Jacks (10) Patent No.: US 7,186,916 B2
(45) Date of Patent: Mar. 6, 2007

(54) RECEPTACLE FOR ENCLOSING LOW-VOLTAGE ELECTRONIC DEVICES IN A WALL

(75) Inventor: Craig A. Jacks, Mound, MN (US)

(73) Assignee: Professional Partners Ltd, St. Paul, MN (US)

( * ) Notice: Subject to any disclaimer, the term of this patent is extended or adjusted under 35 U.S.C. 154(b) by 0 days.

(21) Appl. No.: 11/321,678

(22) Filed: Dec. 29, 2005

(65) Prior Publication Data

US 2006/0102372 A1    May 18, 2006

Related U.S. Application Data

(63) Continuation of application No. 10/677,020, filed on Oct. 1, 2003, which is a continuation of application No. 09/516,199, filed on Feb. 29, 2000, now Pat. No. 6,660,936, which is a continuation of application No. 09/193,876, filed on Nov. 18, 1998, now Pat. No. 6,031,181.

(51) Int. Cl.
*H01H 9/02* (2006.01)

(52) U.S. Cl. ............................. 174/53; 174/58; 174/50; 220/3.2; 220/3.3

(58) Field of Classification Search ................ 174/53, 174/57, 58, 50, 59, 480, 481, 500, 502; 220/3.2, 220/3.3, 3.4, 3.5, 3.6, 3.7, 3.8, 3.9, 4.02, 220/3.94; 361/641, 659, 664; 248/906, 248/343; 439/535, 536, 537; 33/528, DIG. 10
See application file for complete search history.

(56) References Cited

U.S. PATENT DOCUMENTS

| | | | |
|---|---|---|---|
| 3,495,276 A | 2/1970 | Suess | |
| 3,585,273 A | 6/1971 | Paul | |
| 3,616,096 A | 10/1971 | Roeder | |
| 3,620,404 A | 11/1971 | Grasso | |
| 3,884,280 A * | 5/1975 | Chailer | ................... 33/DIG. 10 |
| 4,388,890 A * | 6/1983 | Wester et al. | ........... 33/DIG. 10 |
| 4,408,695 A * | 10/1983 | Balkwill et al. | ............... 174/57 |
| 4,438,859 A * | 3/1984 | Solek | .......................... 220/3.2 |
| 4,649,230 A | 3/1987 | Nielsen | |
| 4,673,097 A | 6/1987 | Schuldt | |
| 4,724,281 A * | 2/1988 | Nix et al. | ...................... 174/53 |
| 4,757,158 A * | 7/1988 | Lentz | ........................... 174/53 |
| 4,794,207 A | 12/1988 | Norberg et al. | |

(Continued)

OTHER PUBLICATIONS

Buchta, J., "Questions and answers about Minnesota's new energy code", Star Tribune, Homes Section, Sep.11, 1999, p. H5.

(Continued)

*Primary Examiner*—Angel R. Estrada
(74) *Attorney, Agent, or Firm*—Crompton, Seager & Tufte LLC (57) ABSTRACT

A receptacle for enclosing low-voltage electronic devices and maintaining the integrity of a vapor barrier. The receptacle forms a cavity having an open side. The receptacle may be mounted within a wall having a vapor barrier and an outer layer. The vapor barrier may be sealed to the receptacle and the outer layer and the vapor barrier may extend over the receptacle to enclose the space within the cavity, thereby forming an airtight enclosure.

22 Claims, 7 Drawing Sheets

U.S. PATENT DOCUMENTS

| | | | |
|---|---|---|---|
| 4,952,754 A | | 8/1990 | Rye |
| 5,011,033 A | | 4/1991 | Roth |
| 5,084,596 A | | 1/1992 | Borsh et al. |
| 5,191,171 A | | 3/1993 | Bordwell |
| 5,300,731 A | * | 4/1994 | DeBaratolo et al. .......... 174/48 |
| 5,397,093 A | | 3/1995 | Chubb et al. |
| 5,421,457 A | | 6/1995 | Listenberger |
| 5,444,183 A | * | 8/1995 | Gehrs et al. ................. 220/3.2 |
| 5,448,012 A | | 9/1995 | Jacob |
| 5,463,533 A | | 10/1995 | Donnerstag |
| 5,476,183 A | | 12/1995 | Harpenau |
| 5,571,993 A | | 11/1996 | Jones et al. |
| 5,573,321 A | | 11/1996 | Bell, Jr. |
| 5,721,394 A | * | 2/1998 | Mulks ......................... 174/48 |
| 5,744,753 A | | 4/1998 | Nattel |
| 5,834,692 A | * | 11/1998 | Lentz ........................... 174/57 |
| 5,837,933 A | | 11/1998 | Fligelman |
| 6,031,181 A | * | 2/2000 | Jacks ........................... 174/58 |
| 6,166,329 A | * | 12/2000 | Oliver et al. .................. 174/58 |
| 6,194,657 B1 | | 2/2001 | Gretz |
| 6,239,365 B1 | * | 5/2001 | McEvers ...................... 174/50 |
| 6,395,981 B1 | | 5/2002 | Ford et al. |
| 6,403,883 B1 | * | 6/2002 | Morgan et al. ................ 174/58 |
| 6,419,102 B1 | * | 7/2002 | Harpenau .................... 220/3.3 |
| 6,437,241 B1 | * | 8/2002 | Neujahr ........................ 174/58 |
| 6,452,097 B1 | * | 9/2002 | DeWall ........................ 174/58 |
| 6,660,936 B1 | | 12/2003 | Jacks |

OTHER PUBLICATIONS

Buchta, J., "Building beyond code", Star Tribune, Homes Section, May 30, 1998, p. H4.

Buchta, J., "Building houses with 'systems engineering'", Star Tribune, Homes Section, Jul. 4, 1998, p. H1 and pp. H4-H5.

Buchta, J. et al., "New houses in Minnesota at risk for moisture and rot", Star Tribune, News Section, Oct. 12, 1997, p. A1.

* cited by examiner

RECEPTACLE FOR ENCLOSING LOW-VOLTAGE ELECTRONIC DEVICES IN A WALL

This application is continuation application of U.S. patent application Ser. No. 10/677,020 filed Oct. 1, 2003, which is a continuation application of U.S. patent application Ser. No. 09/516,199 filed Feb. 29, 2000, now U.S. Pat. No. 6,660,936, which is a continuation application of U.S. patent application Ser. No. 09/193,876 filed on Nov. 18, 1998, now U.S. Pat. No. 6,031,181.

FIELD OF THE INVENTION

The present invention relates generally to components for building construction. More particularly, the present invention relates to receptacles for enclosing low voltage electronic devices.

BACKGROUND OF THE INVENTION

With the rising cost of energy, efforts have been made to provide homes and other buildings with insulation which will more efficiently prevent the loss of heat to the outside. Modem building techniques include the installation of a vapor barrier in the walls of homes or other buildings.

The vapor barrier contains warm, moist air inside the building. If warm air from inside the building penetrates the vapor barrier, moisture from this air may condense inside the walls and ceilings of the building. This condensed moisture can promote mold growth and cause building materials to degrade. The loss of warm air from the inside of the building to the outside of the building also increases the cost of heating the structure.

When mounting speakers, keypads and other low voltage electronic devices in the wall or ceiling of a house or other building it is desirable to protect the low voltage devices from exposure to dirt, debris from building materials and other substances which may cause these devices to deteriorate. Installers who place low-voltage electronic devices in the walls of structures often use standard building materials to fabricate a "custom-built" enclosure at the installation site. To comply with modern building requirements, these custom-built enclosures must be substantially impervious to warm, moist air, and they must be sealingly connected to the existing vapor barrier of the structure. A great deal of skill is required to assemble an enclosure at a work site which will accomplish these goals. Even when an installer is highly skilled, this task is very time consuming.

SUMMARY OF THE INVENTION

A receptacle enclosing low voltage electronic devices and maintaining the integrity of a vapor barrier. The receptacle includes a base and four side walls. Each side wall is joined to two adjacent side walls to form a perimeter wall. The perimeter wall is joined to the base and extends from it in a generally perpendicular fashion. The perimeter wall and base delineate a generally rectangular enclosure with five closed sides and one open side.

The base of the receptacle includes a pattern of concentric geometric shapes. When a portion of the base is seen through a hole cut in a wall, this pattern provides the installer with visual indicators which allow the installer to determine the location of the hidden portions of the receptacle.

The receptacle also includes a plurality of wire located dimples. The material thickness of the wire locator dimples is generally thinner than the thickness of the perimeter wall and the base. The wire locator dimples are useful for creating a hole which will allow a wire to enter the receptacle. Removing the wire locator dimple from the receptacle using a knife or other cutting tool creates a small circular hole in the receptacle. When the desired length of wire is pulled through the hole, the hole may be sealed using any commercially available sealant.

DETAILED DESCRIPTION OF THE INVENTION

Figure 1:
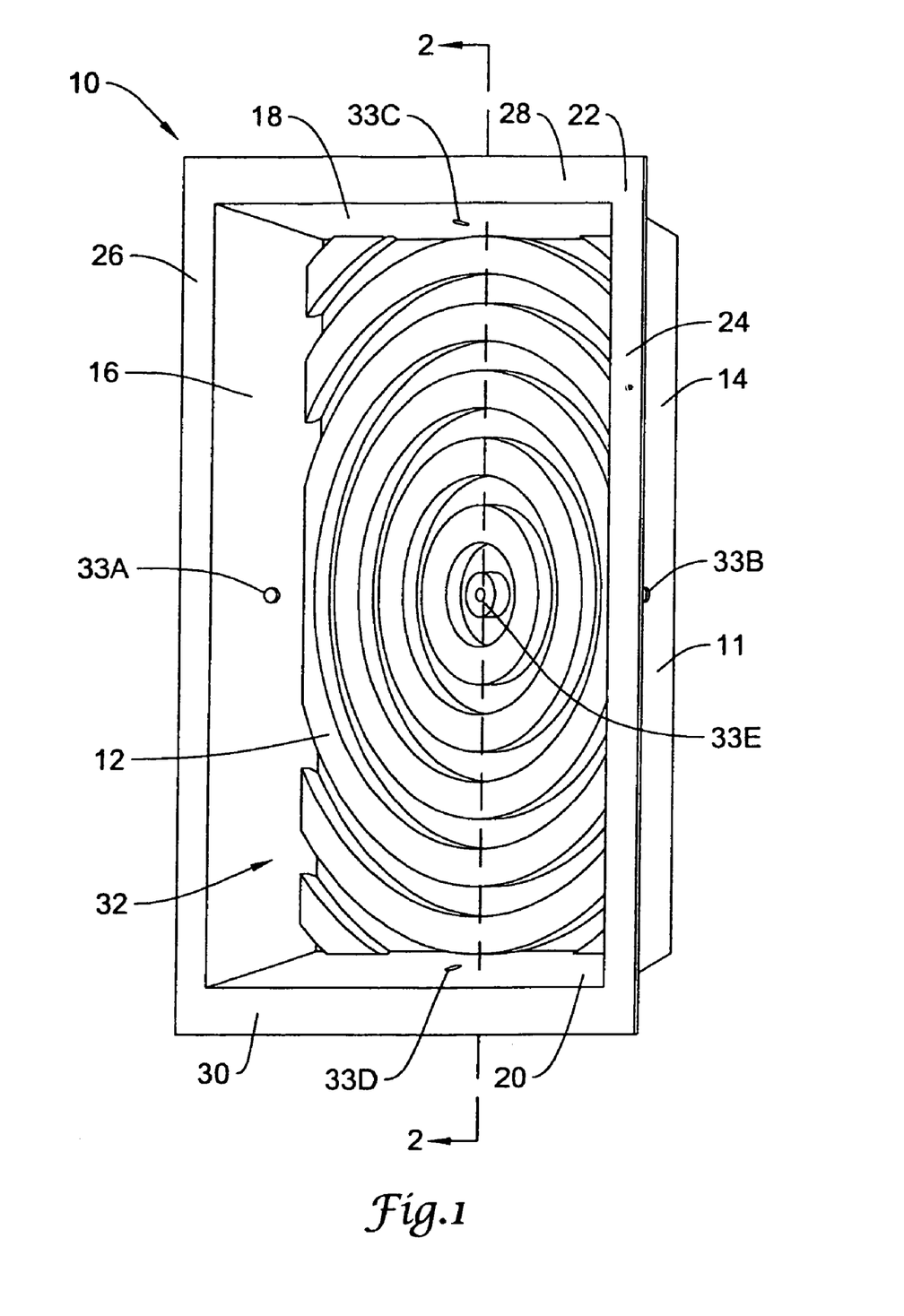
FIG. 1 is a perspective view of a receptacle for enclosing low voltage electronic devices in a wall.

Reference is now made to the figures, in which like element numbers refer to like elements throughout. FIG. 1 is a perspective view of a receptacle shown generally by element number 10. Receptacle 10 includes a base 12, and four side walls 14, 16, 18, and 20. Each side wall is joined to two adjacent side walls to form a perimeter wall 11. Perimeter wall 11 is joined to base 12 and extends from base 12 in a generally perpendicular fashion. Perimeter wall 11 and base 12 delineate a generally rectangular enclosure with five closed sides and one open side.

A mounting flange 22 is joined to side walls 14, 16, 18, and 20. Mounting flange 22 is comprised of side flanges 24 and 26, top flange 28 and bottom flange 30. Flanges 24, 26, 28, and 30 extend in a generally perpendicular fashion from side walls 14, 16, 18, and 20 respectively.

Base 12 includes a pattern of concentric geometrical shapes shown generally at 32. As shown in FIG. 1, the center of pattern 32 is generally aligned with the center of base 12. Pattern 32 in FIG. 1 is a pattern of concentric circles. It is to be understood that another geometric shape could be chosen for pattern 32 without deviating from the spirit or scope of this invention. For example, pattern 32 could be a pattern of polygons, such as triangles, or squares.

Pattern 32 may also be created on base 12 using a variety of techniques. For example, pattern 32 could be injection molded with a series of raised lines which constitute pattern 32. Alternately, pattern 32 could be printed on a label and the label could be adhered to base 12. Pattern 32 could also be printed directly onto base 12 using conventional printing methods such as pad printing or screen printing.

Figure 2:
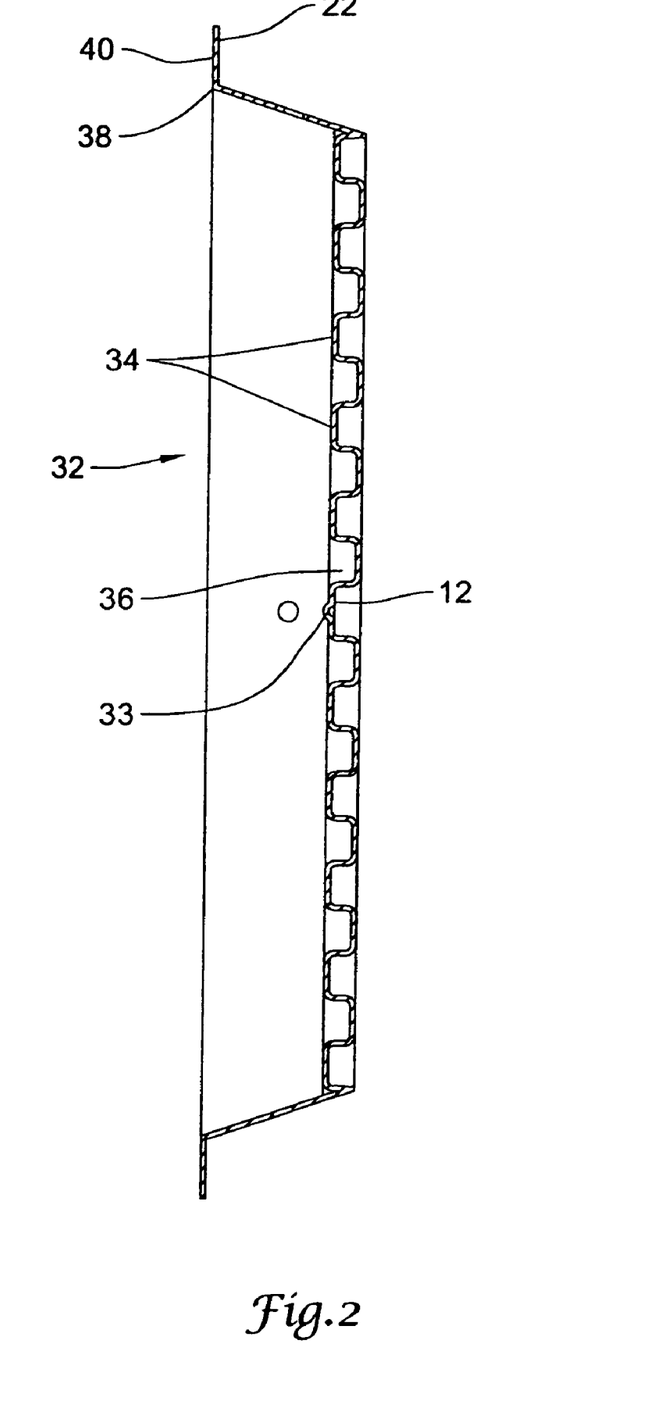
FIG. 2 is a cross sectional view of a receptacle for enclosing low voltage electronic devices in a wall.

In a preferred embodiment, pattern 32 is formed by alternating ridges 34 and grooves 36 in base 12 (best shown in FIG. 2). Ridges 34 and grooves 36 serve to stiffen base 12 in addition to creating pattern 32. Stiffening of base 12 is particularly valuable when receptacle 10 is used to house audio speakers. If base 12 was substantially flexible, an audio speaker may cause it to vibrate and create undesirable noise.

Receptacle 12 includes a plurality of wire locator dimples 33A, 33B, 33C, 33D, and 33E. As best shown in FIG. 2, wire locator dimples 33A, 33B, 33C, 33D, and 33E each are comprised of a localized projection formed from the same material as the wall but extending away from the wall. The material thickness of wire locator dimples 33A, 33B, 33C, 33D, and 33E is generally thinner that the material thickness of side walls 14, 16, 18, and 20, and base 12.

Wire locator dimples 33A, 33B, 33C, 33D, and 33E are useful for creating a hole allowing a wire 62 to pass through one wall of receptacle 10. For example, if an installer intends to pass wire 62 through wall 20, a knife or other cutting tool may be used to cut off wire locator dimple 33D. Cutting off wire locator dimple 33D creates a small circular hole in wall 20. When installing a low-voltage electronic device in receptacle 10 wire 62 will be pulled through this hole. When the desired length of wire 62 is pulled through the hole, the hole will be sealed using any commercially available sealant such as silicone caulk or acrylic caulk. Sealing the hole which allows wire 62 to enter receptacle 10 is necessary in order to maintain a continuous vapor barrier within wall 50. Wire locator dimples 33A, 33B, 33C, 33D, and 33E allow an installer to quickly create a small round hole of uniform size and shape. Only a small amount of sealing material is require to seal this small uniformly shaped hole after wire 62 has been positioned. This saves time for the installer and improves the integrity of the vapor barrier.

In one embodiment of receptacle 10, a layer of pressure sensitive adhesive 38 is applied to flange 22 as shown in FIG. 2. Pressure sensitive adhesive 38 may be covered with a release liner 40 to prevent pressure sensitive adhesive 38 from adhering to any objects while receptacle 10 is transported and stored prior to use. Release liner 40 may be comprised of a layer of paper or plastic film treated with a release agent. Release liner materials of this type are well known in the art and may use silicone or fluoropolymer based release agents.

Receptacle 10 may be made from any substantially rigid material. The preferred material for receptacle 10 is a thermoplastic material such as ABS or PVC. Thermoplastic materials are low in cost and they can be easily fabricated using conventional injection molding, or thermoforming processes. In many applications a flame-retardant thermoplastic material will be preferred.

Figure 3:
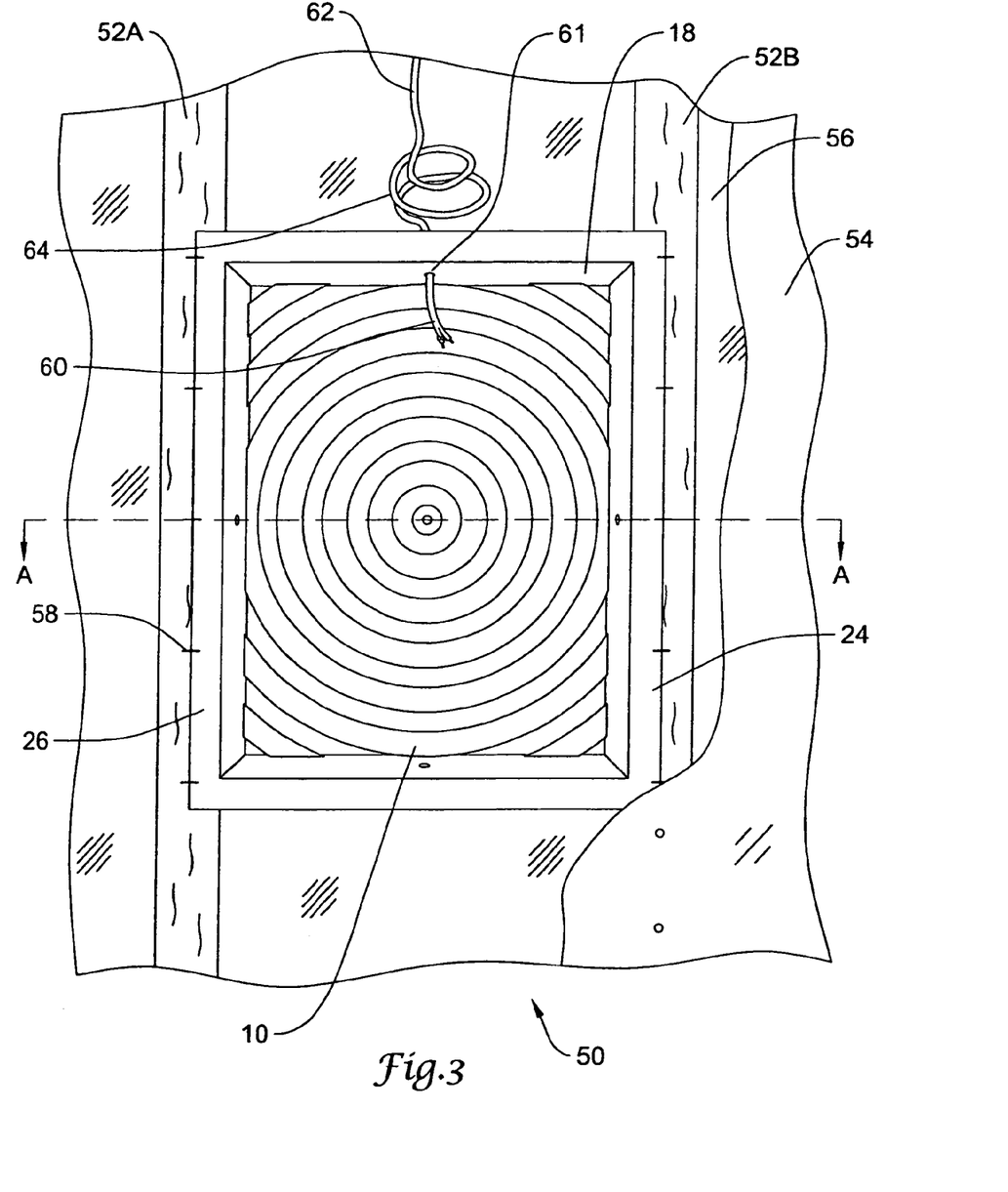
FIG. 3 is a plan view of a receptacle positioned inside a wall.

A portion of a building wall 50 is illustrated in FIG. 3 with the inventive receptacle 10 installed. Wall 50 includes structural members 52A, 52B, and outer layer 54. Structural members 52A, 52B may be comprised of a number of commonly used building materials including steel, aluminum, and wood. A number of materials may also be used to fabricate outer layer 54 including plaster, wood, acoustic tiles, gypsum board, or a wood fiber composite material. In the art gypsum board is sometimes referred to as drywall, or by the trademarked brand name SHEETROCK. A barrier film 56 is positioned directly behind outer layer 54 in wall 50. Barrier film 56 may be any low cost, thin material which is substantially impervious to air and water vapor. Barrier film 56 is positioned in wall 50 to prevent the passage of warm moist air from the inside of the building to the outside of the building. To accomplish this goal completely, any holes made in barrier film 56 is preferably completely sealed. In the art the walls of a building are assembled to include a continuous sealed layer which is comprised of multiple sheets of barrier film 56 sealingly attached along their edges. In the art, this continuous sealed layer is referred to as the vapor barrier. An objective of the present invention is to provide method of installing low-voltage electronic devices in a wall while maintaining the integrity of the vapor layer.

Receptacle 10 is positioned in wall 50 so that side flanges 24 and 26 overlap structural members 52B and 52A respectively. A plurality of fasteners 58 have been used to attach side flanges 24 and 26 to structural members 52B and 52A. In the embodiment shown in FIG. 3 fasteners 58 are depicted as staples, however it should be understood that other fasteners could be used without departing from the spirit and scope of this invention. For example, fasteners 58 could be screws, nails, or rivets.

In an alternate embodiment receptacle 10 may be positioned in wall 50 so that top flange 28 and bottom flange 30 overlap structural members 52A, 52B. In a preferred embodiment the length of side walls 14, 16, 18, and 20 are selected so that receptacle 10 will fit between structural members 52A, 52B which have be placed a distance part which is commonly used in the art. For example, the length of side walls 18 and 20 may be selected so that receptacle 10 will fit between structural members which have been placed on 16 inch centers and the length of side walls 14 and 16 may be selected so that receptacle 10 will fit between structural members which have been placed on 24 inch centers.

An end 60 of wire 62 is disposed inside receptacle 10. Wire 62 passes through a wire entry hole 61 in side wall 18 of receptacle 10. A wire coil or bundle 64 is formed of wire 62 and is disposed immediately outside one wall of receptacle 10. Although FIG. 3 illustrates wire 62 passing through side wall 18, it should be noted that wire 62 may pass through any side wall 14, 16, 18, 20, or base 12 without departing from the scope or spirit of this invention.

It should also be noted that although the specific embodiment illustrated in FIG. 3 depicts receptacle 10 installed in a wall, receptacle 10 may be installed in other portions of a building without departing from the spirit or scope of this invention. For example, receptacle 10 may be mounted in a ceiling to house an audio speaker.

Figure 4:
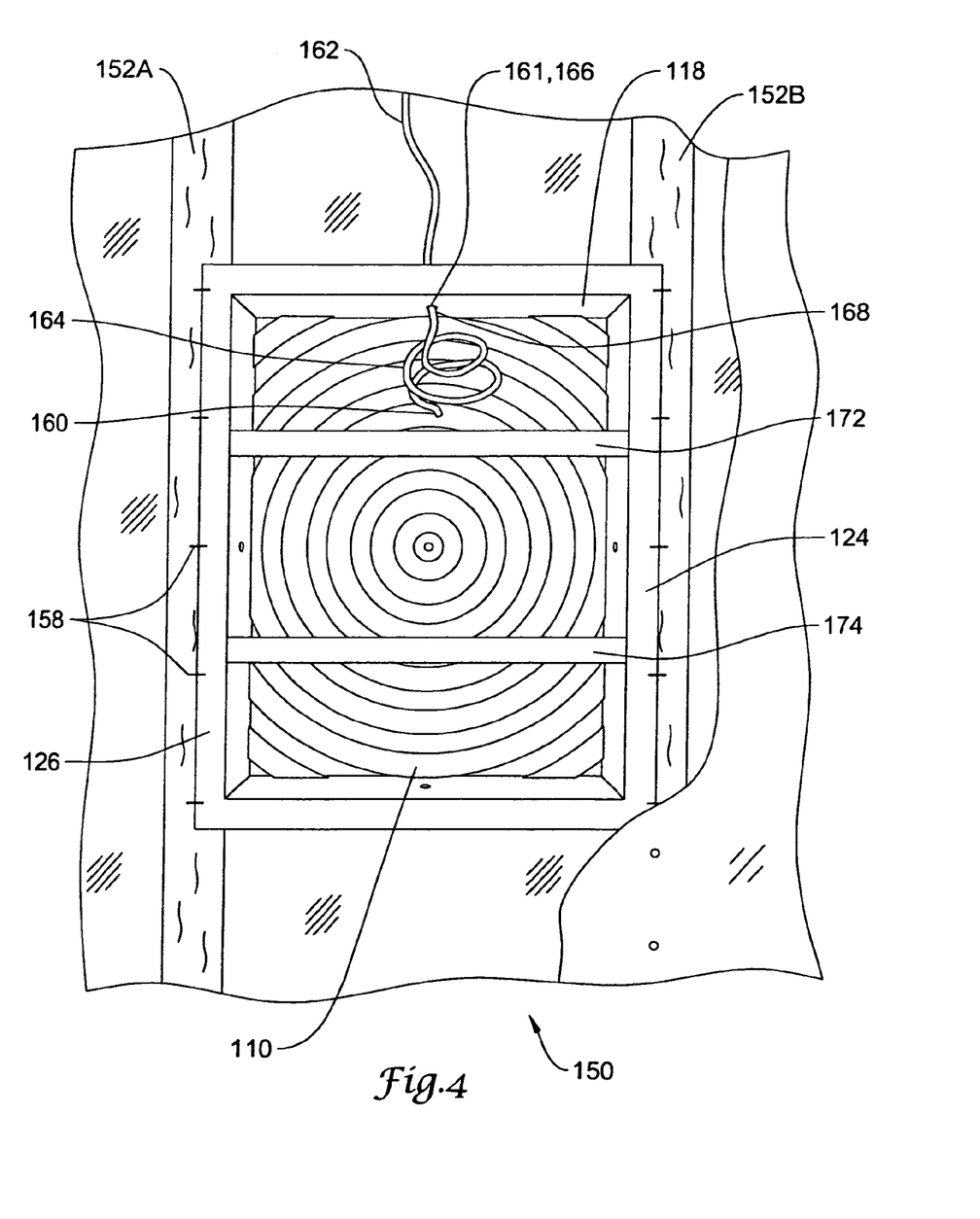
FIG. 4 is a plan view of an alternate embodiment of a receptacle positioned in a wall.

FIG. 4 is a plan view illustrating a receptacle 110. Receptacle 110 is positioned in wall 150 so that side flanges 124 and 126 overlap structural members 152B and 152A respectively. A plurality of fasteners 158 have been used to attach side flanges 124 and 126 to structural members 152B and 152A.

A wire 162 extends through a wire entry hole 161 in side wall 118 of receptacle 110. A wire bundle 164 and a wire end 160 are both disposed inside receptacle 110. Wire entry hole 161 was created by cutting off a wire locator dimple (not shown). Wire entry hole 161 is covered by seal 166 which is adhesively bonded to both wire 162 and wall 118 of receptacle 110. Seal 166 is created by dispensing a sealant 168 onto both wire 162 and wall 118 in the vicinity of wire entry hole 161, then allowing sealant 168 to cure. Sealant 168 may be any one of a number of commercially available materials including silicone caulk and acrylic caulk. Seal 166 ensures the integrity of the vapor barrier by closing wire entry hole 161 which was made in wall 118 to accommodate wire 162.

A plurality of mounting brackets 172, 174 are disposed in receptacle 110. Mounting brackets 172, 174 may be attached to receptacle 110 with mechanical fasteners (not shown) such as rivets or screws. Mounting brackets 172, 174 may also be adhered to receptacle 110 with an adhesive (not shown). Mounting brackets 172, 174 provide a convenient place to attach low-voltage electronic devices which are being housed in receptacle 110.

Figure 5:
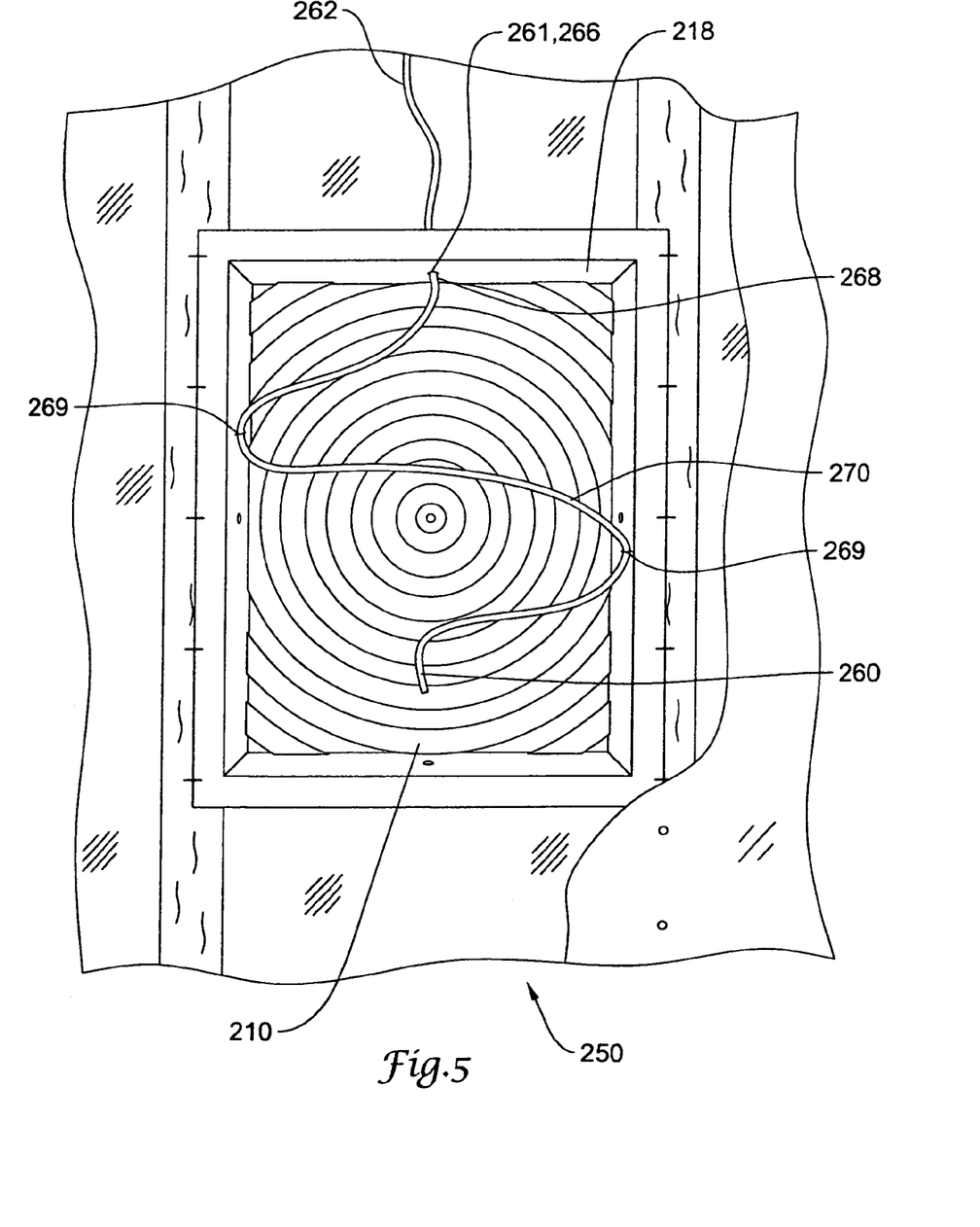
FIG. 5 is a third embodiment of receptacle positioned in a wall.

FIG. 5 is a plan view of a receptacle 210 positioned in a wall 250. A wire 262 extends through seal 268 and through a wire entry hole 261 in a side wall 218 of receptacle 210. Seal 266 is adhesively bonded to both wire 262 and wall 218. Seal 266 is created by dispensing a sealant 268 onto both wire 262 and wall 218 in the vicinity of wire entry hole 261, then allowing sealant 268 to cure. Sealant 268 may be any one of a number of commercially available materials including silicone caulk and acrylic caulk.

A zig/zag or serpentine wire pattern 270 is disposed inside of receptacle 210. Serpentine wire pattern 270 is comprised of a length of wire 262 which has been bent into the shape shown in the FIG. 5. Fasteners 269, such as staples preferably loosely hold wire pattern 270 in place until the electronic device is installed.

Figure 6:
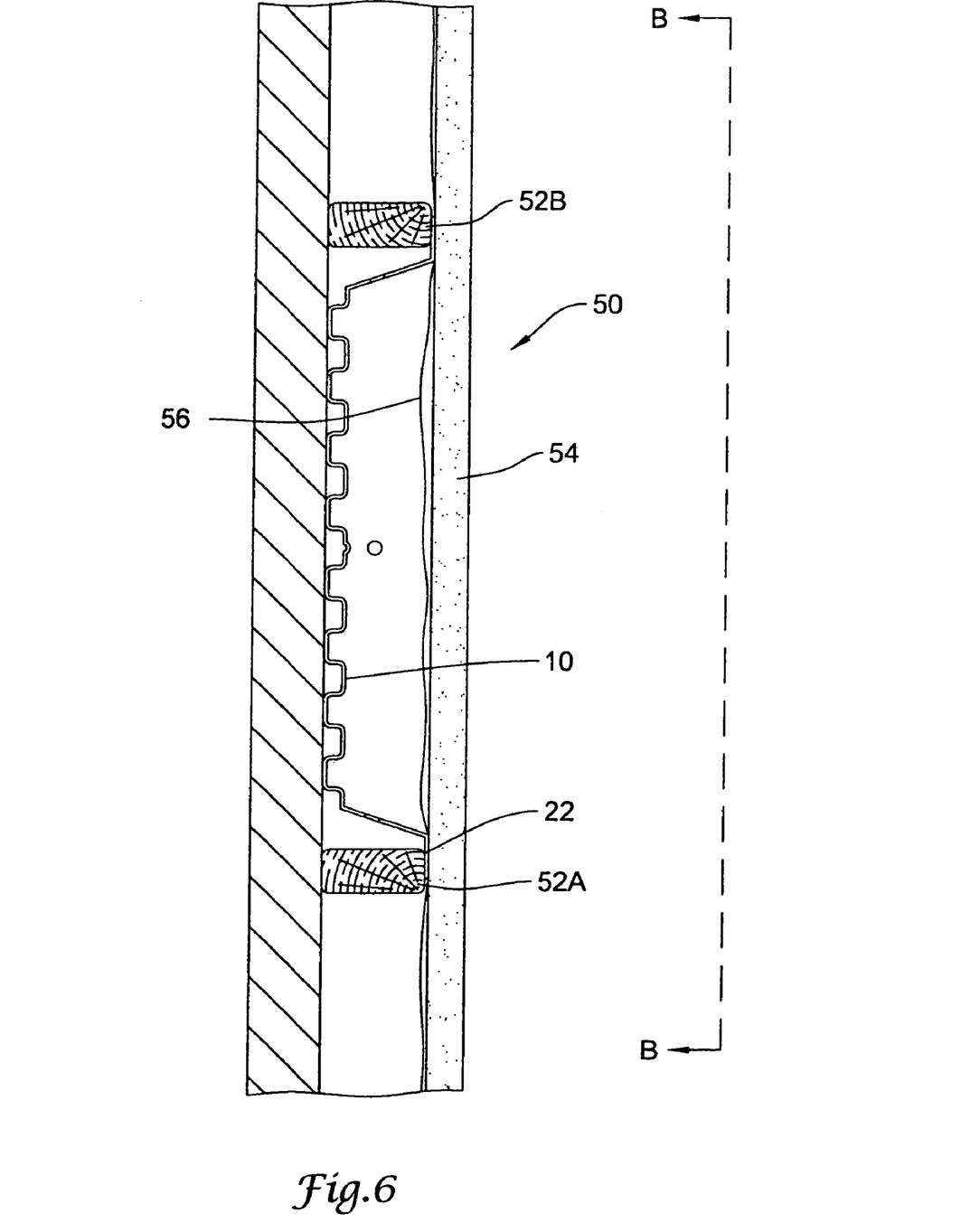
FIG. 6 is a cross sectional view of a wall with a receptacle for enclosing low voltage electronic devices positioned inside of it.

FIG. 6 is a section of wall 50 taken along section line A—A in FIG. 3. Receptacle 10 is illustrated in FIG. 6 in a position between structural members 52A and 52B. Barrier film 56 is shown covering receptacle 10. Flange 22 of receptacle 10 is sealingly connected to barrier film 56. A number of methods may be used to accomplish this seal. In one embodiment pressure sensitive adhesive layer 38 is pre-applied to flange 22 and covered with release liner 40. Release liner 40 is removed prior to covering receptacle 10 with barrier film 56. When barrier film 56 is positioned over receptacle 10 it will readily adhere to pressure sensitive adhesive layer 38 and form a sealed connection with flange 22.

An alternate method for sealing barrier film 56 to flange 22 is to apply an adhesive to flange 22 just prior to covering receptacle 10 with barrier film 56. Spray on adhesives suitable for this purpose are commercially available from 3M Company (St. Paul, Minn.). Finally, sealing tape may also be use to seal barrier film 56 to flange 22.

Figure 7:
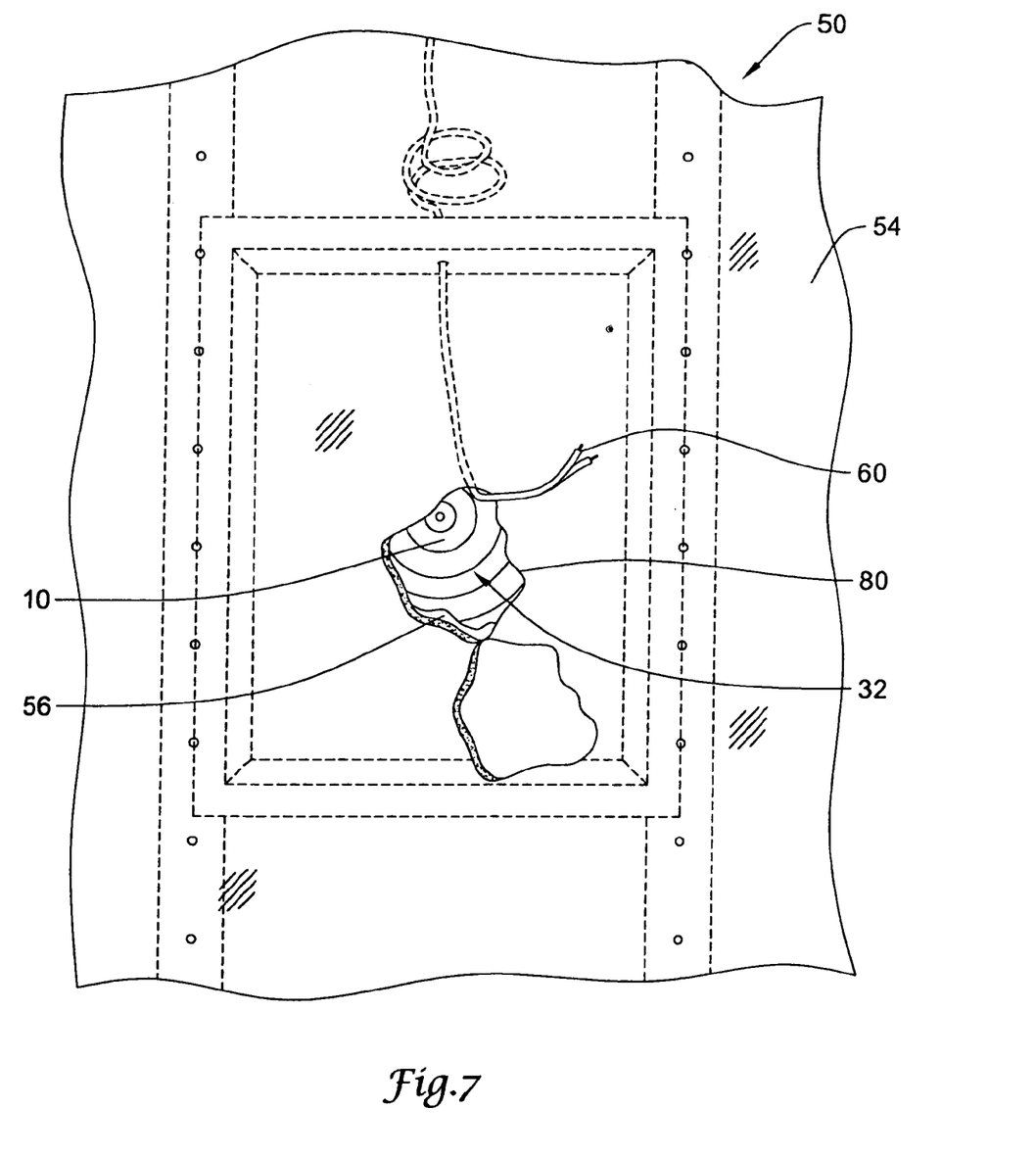
FIG. 7 is a plan view of a wall with a hole cut through the wall for fastening a low voltage electronic device.

FIG. 7 is a plan view of wall 50 taken from the point of view of line B—B shown in FIG. 6. A hole 80 has been cut through outer layer 54 and barrier film 56. Geometric pattern 32 of receptacle 10 is visible through hole 80. Geometric pattern 32 provides the installer of a low voltage electronic device with a visual reference point. After looking at geometric pattern 32, the installer knows which direction he or she must reach to find wire end 60.

Referring to FIG. 7 and FIG. 3, the preferred steps used to enclose a low-voltage electronic device and maintain the integrity of a vapor barrier are as follows:

1. Choose which of the wire locator dimples is the most convenient place for wire 62 to enter receptacle 10.
2. Cut off the wire locator dimple to create wire entry hole 61.
3. Position receptacle 10 within wall 50 so that at least one flange is in direct contact with a structural member.
4. Secure the flange to the structural member.
5. Thread wire 62 through wire entry hole 61 in receptacle 10.
6. Place barrier film 56 over structural members 52A, 52B and receptacle 10.
7. Seal barrier film 56 to flange 22 of receptacle 10.
8. Complete the assembly of the wall by positioning outer layer 54 over barrier film 56.
9. Connect a radio frequency transmitter to wire 62.
10. Use a radio frequency receiver to determine the approximate location of wire end 60; in this approximate location, create hole 80 through barrier film 56 and outer layer 54.
11. Visually examine pattern 32 to determine the location of wire end 60 relative to hole 80.
12. Reach inside hole 80 with one hand and retrieve wire 62 by grasping wire end 60.
13. Pull out the desired length of wire 62 and attach wire end 60 to the low-voltage electronic device which is being installed.
14. Seal wire entry hole 61 in enclosure 10 using a sealant such as silicone caulk or acrylic caulk.
15. Complete the installation by fastening the low-voltage electronic device to outer layer 54.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed is:

1. An enclosure for use as an electrical compartment comprising:
    a wall of a structure comprising structural support members, an outer layer and a vapor barrier;
    a receptacle forming a cavity with an open side, the receptacle comprising a perimeter wall and a base;
    wherein the open side is sealingly attached to the vapor barrier, and both the vapor barrier and the outer layer extend across the open side of the receptacle enclosing the cavity of the receptacle, forming an airtight enclosure.

2. The enclosure of claim 1, wherein the vapor barrier is placed in the wall between the outer layer and the structural members.

3. The enclosure of claim 1, wherein the perimeter wall is formed by two pairs of substantially parallel walls that are substantially perpendicular to the base.

4. The enclosure of claim 1, wherein the base has a pattern of geometric shapes and the pattern is centered on the base.

5. The enclosure of claim 1, the receptacle further comprising a flange, the flange extending from the perimeter wall at substantially a perpendicular angle.

6. The enclosure of claim 5, wherein the vapor barrier is sealed to the flange.

7. The enclosure of claim 6, further Comprising an adhesive disposed between the vapor barrier and the flange.

8. The enclosure of claim 1, the enclosure further comprising a wire that terminates in the receptacle, the wire passing from outside to inside the receptacle through a hole in the receptacle, the hole being sealed around the wire.

9. The enclosure of claim 1, wherein the receptacle is attached to at least one of the structural support members.

10. The enclosure of claim 1, wherein the receptacle comprises a thermoplastic material.

11. The enclosure of claim 10, wherein the thermoplastic material is flame retardant.

12. The enclosure of claim 1, wherein the receptacle is formed from a single piece of plastic.

13. The enclosure of claim 1, wherein the structure is a building and wherein the outer layer is disposed on the side of the wall facing an indoor portion of the building.

14. A method of creating an electronic device enclosure comprising the steps of:
    providing a receptacle having a base, a perimeter wall surrounding the base, and a flange attached generally perpendicularly to the perimeter wall, the perimeter wall and base forming a cavity with an opening;

positioning the receptacle within a wall of a building so as to allow at least the flange contact with a structural member;

securing the flange to the structural member;

placing a baffler film over the structural member of the wall and the receptacle;

sealing the barrier film to the receptacle; and placing an outer layer over the barrier film such that the barrier film is disposed between the flange and the outer layer, and the barrier film and the outer layer each substantially cover the opening in the receptacle, forming an airtight enclosure.

15. The method of claim 14, further comprising the steps of:

forming an aperture in the receptacle;

passing a conductive wire through the aperture in the receptacle.

16. The method of claim 14, further comprising the step of creating a hole through the barrier film and the outer layer within the confines of the receptacle to accommodate a low-voltage electronic device.

17. The method of claim 14, further comprising the step of applying an adhesive to the flange.

18. The method of claim 14, wherein the base comprises a pattern of geometric shapes and the pattern is centered on the base.

19. The method of claim 14, further comprising the steps of:

forming a hole in the wall; and introducing a portion of a wire through the hole into the cavity.

20. The method of claim 19, further comprising the step of forming the wire into a zigzag pattern.

21. The method of claim 19, wherein the wire forms a coil.

22. The method of claim 19, further comprising the step of sealing the hole with a sealant subsequent to the introduction of the wire portion.

* * * * *

UNITED STATES PATENT AND TRADEMARK OFFICE
CERTIFICATE OF CORRECTION

PATENT NO. : 7,186,916 B2
APPLICATION NO. : 11/321678
DATED : March 3, 2007
INVENTOR(S) : Craig A. Jacks It is certified that error appears in the above-identified patent and that said Letters Patent is hereby corrected as shown below:

Column 6
Line 45, delete "Comprising", and insert therefor --comprising--.

Column 7
Line 5, delete "baffler", and insert therefor -- barrier--.

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,186,916 B2 | Page 1 of 1 |
| APPLICATION NO. | : 11/321678 | |
| DATED | : March 6, 2007 | |
| INVENTOR(S) | : Craig A. Jacks | |

It is certified that error appears in the above-identified patent and that said Letters Patent is hereby corrected as shown below:

Column 6
Line 45, delete "Comprising", and insert therefor --comprising--.

Column 7
Line 5, delete "baffler", and insert therefor -- barrier--.

This certificate supersedes Certificate of Correction issued June 5, 2007.

Signed and Sealed this

Third Day of July, 2007

JON W. DUDAS
*Director of the United States Patent and Trademark Office*